United States Patent Office 3,152,169
Patented Oct. 6, 1964

3,152,169
PROCESS FOR THE PRODUCTION OF SULFUR-CONTAINING ALKALI SALTS
Heinrich Hahn, Günther Mehr, and Albert van Schoor, Darmstadt, Germany, assignors to E. Merck Aktiengesellschaft, Darmstadt, Germany
No Drawing. Filed Sept. 10, 1962, Ser. No. 222,676
6 Claims. (Cl. 260—465.1)

This invention relates to the production of alkalicyanodithio formates and dialkali salts of 1,2-dicyano-1,2-dimercaptoethylene, particularly to a new convenient solvent in which the compounds can be produced.

In 1955, Bahr and Schleitzer reported the preparation of alkalicyanodithio formates and dialkali salts of 1,2-dicyano-1,2-dimercaptoethylene by the following reaction:

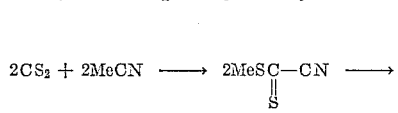 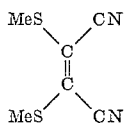

wherein Me=an alkali metal.

The authors repeatedly emphasized that the preceding reaction is basically dependent of the nature of the reaction medium (see Chemische Technik, vol. 8, page 597, left column, paragraph 5). As a matter of fact, the authors have clearly stated that dimethylformamide is the "only suitable reaction medium" (Reports of the German Chemical Society, vol. 88, p. 1771, line 6 from bottom). Furthermore, in a later publication (Chemische Technik, vol. 8, p. 597, 1956), it is reported that many experiments using other solvents were unsuccessful, the specific solvents being used including alcohol, water, pyridine, and methyl cyanide. Thus, it is clear that for many years there has been an accepted assumption that the employment of dimethylformamide as the solvent is indeed necessary for conducting the reaction.

It is important to note, however, that dimethylformamide is far from an ideal solution, from the technological and economic standpoints, in general. In particular it is very difficult to remove dimethylformamide from aqueous solutions, which recovery is essential for economic operation on an industrial scale.

Consequently, there has been a long felt need in industry for an easily recoverable solvent which can replace dimethylformamide as a reaction medium.

The principal object of this invention is to provide a new solvent medium for the production of alkalicyanodithio formates and dialkali salts of 1,2-dicyano-1,2-dimercaptoethylene by reacting carbon disulfide with an alkali cyanide.

Another object of this invention is to provide an easily recoverable solvent when used in the latter reaction.

Upon further study of the specification and appended claims, other objects and advantages of this invention will become apparent.

The objects of this invention are attained by the discovery that alkalicyanodithio formates and dialkali salts of 1,2-dicyano-1,2-dimercaptoethylene can be obtained in relatively high yields by reacting carbon disulfide with alkali cyanide in a solvent medium consisting essentially of water and a ketone of the following formula:

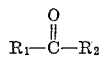

wherein $R_1$ and $R_2$ are different or the same, and represent alkyl, or cycloalkyl, or arylhydrocarbon, or the hydroxylated derivatives thereof.

It is further provided that the ketone contain 3–13 carbon atoms. Still further, if a hydroxylated radical is employed, then the ratio of hydroxyl groups to the number of carbon atoms in the ketone is preferably 1–3 hydroxyl groups per 10 carbon atoms.

Of the various ketones that are embraced by the preceding generic formula, the following yield highly satisfactory results:

Acetone,
Diethyl ketone,
Di-n-propyl ketone,
Diisopropyl ketone,
Di-n-butyl ketone,
Di-tert.-butyl ketone,
Methyl ethyl ketone,
Methyl propyl ketone,
Ethyl propyl ketone,
Cyclohexyl methyl ketone,
Cyclohexyl ethyl ketone,
Dicyclohexyl ketone,
Phenyl methyl ketone,
Phenyl ethyl ketone,
Diacetone alcohol,
Cyclohexanone,
Beta,beta'-dihydroxy-diethyl ketone,
Dihydroxy acetone, and mixtures thereof. Of these, the best results are obtained with acetone, cyclohexanone, diacetone alcohol and dihydroxy acetone. It is to be noted that the latter two compounds, as well as the penultimate compound in the table, are hydroxy-alkyl-ketones.

In addition to the ketone, it is essential to conduct the reaction in the presence of water. The water concentration in the solvent may fluctuate within broad limits, the weight ratio of water to ketone being generally about 3 to 20 parts by weight of water per 100 parts by weight of ketone. Preferably, it is desirable to employ a reaction solvent containing 3–15% by weight of water and 97–85% by weight of ketone, respectively. Particularly excellent results have been obtained with 5–10% by weight of water and 95–90% by weight of ketone.

As the alkali cyanide starting material, it is possible to utilize any member of the generic group. It is to be appreciated, however, that the most inexpensive cyanides are sodium cyanide and potassium cyanide, and consequently, it is greatly preferred to use these latter two cyanides, and particularly sodium cyanide.

Referring now to the basic reaction equation, it is seen that the alkalicyanodithio formate is formed before the formation of the 1,2-dicyano-1,2-dimercaptoethylene. However, it is possible to preferentially obtain one or the other of these compounds by controlling the reaction times and temperatures.

Under mild reaction conditions, for example at low temperatures and relatively short reaction times, there are predominantly formed the alkali salts of the cyanodithioformic acid. Temperatures of about 15–40° C., preferably about 30–35° C., have proven to be advantageous when employed in conjunction with reaction times of between 15 minutes and 10 hours for the formation of these formic acid salts.

On the other hand, as more favorable reaction conditions are utilized, such as high temperatures or longer reaction times, there is thereby formed a simultaneous precipitation of elemental sulfur with the formation of the dialkali salt of the 1,2-dicyano-1,2-dimercaptoethylene. To obtain these latter compounds, it is advantageous to operate at a reaction temperature of above 40° C., preferably at 50–90° C., in conjunction with reaction times of from 15 minutes to 100 hours. Of course, it is possible to employ shorter reaction times by using higher temperatures, and vice versa.

It is to be appreciated that optimum reaction times and temperatures for the desired final product can be easily determined by simple tests when employing the different ketones of this invention. In other words, each ketone will have somewhat different optimum times and temperatures for the reaction.

According to the invention, it is thus possible to produce in a good yield and utilizing inexpensive solvents, alkalicyanodithioformates and dialkali salts of the 1,2-dicyano-1,2-dimercaptoethylene, which are very important as intermediate products for the production of dyes (see, for example, Angewandte Chemie, vol. 72, p. 963, 1960), as well as of pesticides (see, for example, German Patent 1,060,655). The solutions of the alkalicyanodithioformate or of the dialkali salt of the 1,2-dicyano-1,2-dimercaptoethylene, respectively, obtained according to the process of the invention can be utilized directly as starting solutions for the production of pesticides or dyes, respectively, without the necessity of isolating the salts formed.

Without further analysis, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

*Example 1*

A mixture of 100 g. of sodium cyanide, 1000 g. of 95% aqueous acetone and 150 ml. of carbon disulfide is heated while stirring for 7 hrs. in a water bath at a bath temperature of 50–55° C. The resultant reaction mixture is concentrated at a maximum temperature of 40° C. under reduced pressure. The crystalline residue obtained is removed by suction and consists of a mixture of the disodium salt of the 1,2-dicyano-1,2-dimercaptoethylene with elemental sulfur. The salt is dissolved with methanol and filtered clean. By concentrating the methanol-containing solution there are obtained 150 g. of the disodium salt of 1,2-dicyano-1,2-dimercaptoethylene.

*Example 2*

A mixture of 5 g. of sodium cyanide, 47.5 g. of diacetone alcohol, 2.5 ml. of water and 8 g. of carbon disulfide is agitated overnight at 30° C. The dark-colored reaction mixture is thereafter filtered cleanly. For the purpose of characterizing the dissolved sodium salt of the cyanodithioformic acid, the reaction solution is mixed with 60 ml. of a 2 normal solution of tetraethyl ammonium hydroxide, whereby approximately 12 g. of the crystalline tetraethyl ammonium salt of the cyanodithioformic acid are separated within a few minutes.

*Example 3*

A mixture of 2.5 g. of sodium cyanide, 3.2 ml. of carbon disulfide, 25 ml. of methyl ethyl ketone and 1 ml. of water is agitated for 16 hrs. at 30° C. The reaction solution is filtered for clarification. The filtrate contains the monosodium salt of cyanodithioformic acid which is identified by the addition of methanolic tetraethylammonium hydroxide.

*Example 4*

2.5 g. of sodium cyanide are dissolved in 25 ml. of diethyl ketone and agitated overnight with 3.2 ml. of carbon disulfide and 1 ml. of water at 30° C. The reaction solution is filtered. The filtrate contains the monosodium salt of cyanodithioformic acid which may be separated with a solution of tetraethylammonium hydroxide in methanol.

*Example 5*

2.5 g. of sodium cyanide, 3.2 ml. of carbon disulfide, 25 ml. of acetophenone and 1 ml. of water are agitated for 15 hrs. at 30° C. The reaction mixture is filtered. The monosodium salt of the cyanodithio formic acid present in the filtrate may be identified as set forth in Examples 3 and 4.

*Example 6*

In accordance with Example 1, 100 g. of sodium cyanide, 900 g. of cyclohexanone and 45 ml. of water are heated with 150 ml. of carbon disulfide to 65–70° C. while stirring for 7 hrs. There is obtained the disodium salt of 1,2-dicyano-1,2-dimercaptoethylene.

*Example 7*

26.5 g. of potassium cyanide are agitated with 36.7 g. of carbon disulfide and 200 ml. of 95% aqueous acetone for 10 hrs. at 50° C. The reaction mixture is filtered and the filtrate is freed of acetone by the injection of steam. The precipitated sulfur is filtered off. The solution contains the potassium salt of 1,2-dicyano-1,2-dimercaptoethylene which by reaction with naphthoquinone-1,4, can be converted into 2,3-dicyano-1,4-dithia-anthraquinone in a yield of above 60%.

*Example 8*

100 g. of sodium cyanide, 230 g. of carbon disulfide, 955 g. of acetone and 45 g. of water are agitated for 56 hrs. at 20–22° C. The reaction mixture is filtered and the acetone is distilled off with water vapor. The sulfur separated after cooling is filtered off. The solution contains the disodium salt of the 1,2-dicyano-1,2-dimercaptoethylene which by means of reaction with napthoquinone-1,4 may be converted into 2,3-dicyano-1,4-dithia-anthraquinone.

*Example 9*

10 g. of sodium cyanide and 30 g. of carbon disulfide are introduced into 100 g. of warm acetone having a water content of 6.5%. The reaction mixture is vigorously agitated in a pressure vessel for 45 minutes at 80° C. After cooling, the non-reacted sodium cyanide is filtered off. The filtrate is freed of the acetone by the injection of steam. The precipitated sulfur is filtered off; the aqueous solution contains the sodium salt of the 1,2-dicyano-1,2-dimercaptoethylene, which by the addition of an ammoniacal zinc chloride solution can be converted into the difficultly soluble zinc salt of 1,2-dicyano-1,2-mercaptoethylene.

The preceding examples can be repeated with similar results by substituting the ketones of the examples with the other ketones mentioned in this application, either generically or specifically.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. In a process comprising the reaction of carbon disulfide with an alkali metal cyanide to produce a member of the group consisting of alkalicyanodithioformates, dialkali metal salts of 1,2-dicyano-1,2-dimercaptoethylene, and mixtures thereof, the improvement which comprises conducting said reaction in a solvent consisting essentially of 100 parts by weight of a ketone and 3 to 20 parts by weight of water, said ketone having the following formula:

$$R_1-\overset{O}{\underset{\|}{C}}-R_2$$

wherein $R_1$ and $R_2$ are selected from the group consisting of alkyl, cycloalkyl, arylhydrocarbon, and hydroxyl alkyl, with the provision that said ketone contain 3–13 carbon atoms.

2. The process of claim 1 wherein the ketone is acetone.
3. The process of claim 1 wherein the ketone is cyclohexanone.
4. The process of claim 1 wherein the ketone is diacetone alcohol.

5. The process of claim 1 wherein the ketone is dihydroxy acetone.

6. In a process of claim 1 wherein the solvent consists essentially of 90–95% by weight of ketone and 10–5% by weight of water.

References Cited in the file of this patent

UNITED STATES PATENTS

| | | |
|---|---|---|
| 3,101,344 | Vest | Aug. 20, 1963 |
| 3,101,365 | Vest | Aug. 20, 1963 |

OTHER REFERENCES

Simmons et al.: J.A.C.S., 84, December 20, 1962, pages 4746–4756.

Simmons et al.: J.A.C.S., 84, December 20, 1962, pages 4756–4771.

Simmons et al.: J.A.C.S., 84, December 20, 1962, pages 4772–4789.

Bahr et al.: Chemische Berichte, vol. 88, pages 1771–1777 (1955).

Bahr et al.: Chemische Berichte, vol. 90, pages 438–443 (1957), QD–1–D4.